May 19, 1970    L. SHATOSKA ET AL    3,512,598
TRACK EXTENSION MEANS

Filed March 14, 1968    2 Sheets-Sheet 1

INVENTOR'S:
LYNN SHATOSKA
TROY SHATOSKA
RONALD W. SHATOSKA
BY: *Calvin J. Laiche*
    ATTORNEY May 19, 1970　　L. SHATOSKA ET AL　　3,512,598
TRACK EXTENSION MEANS
Filed March 14, 1968　　2 Sheets-Sheet 2
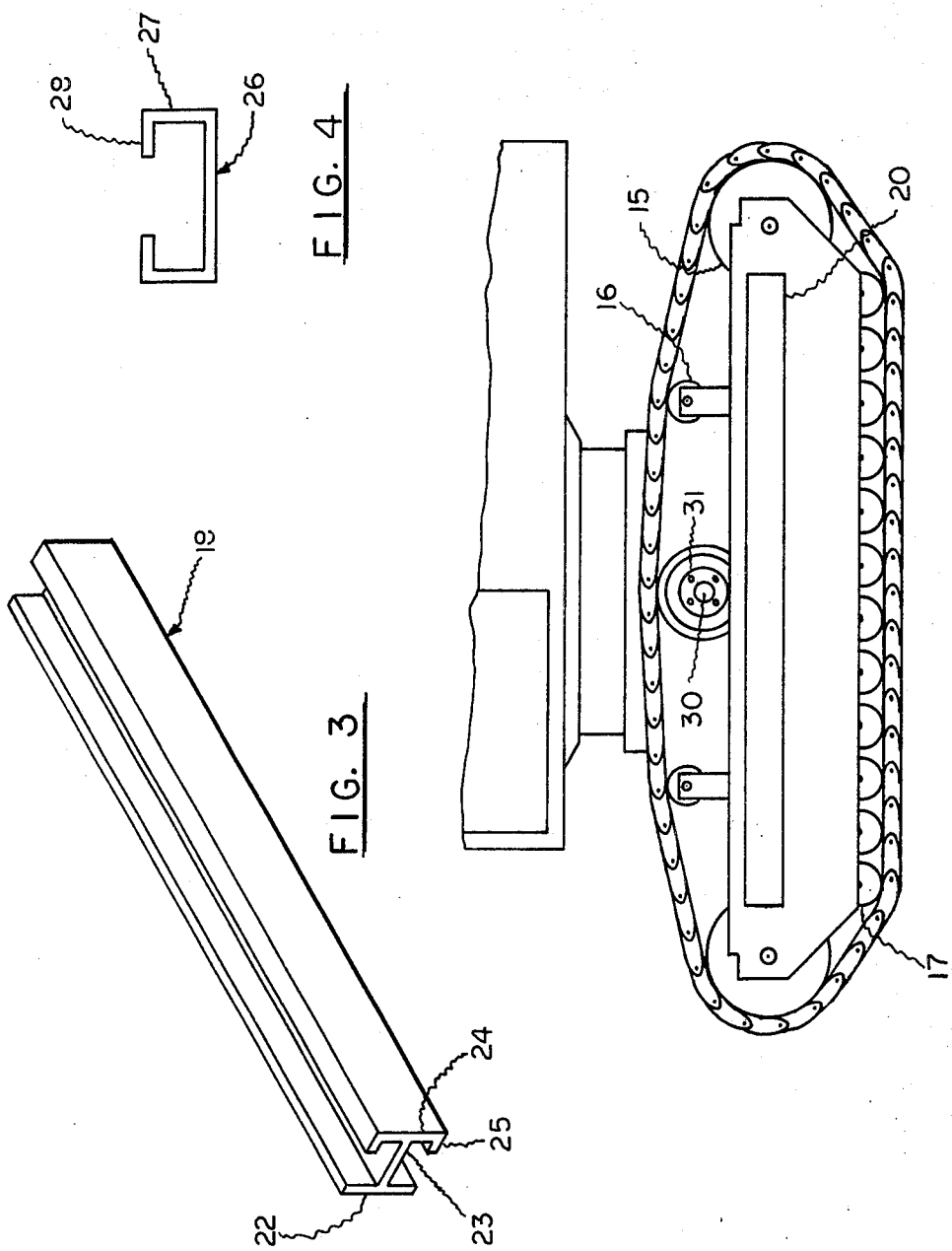
INVENTORS:
LYNN SHATOSKA
TROY SHATOSKA
RONALD W. SHATOSKA
BY: Calvin J. Laicke
ATTORNEY

United States Patent Office 3,512,598
Patented May 19, 1970

3,512,598
TRACK EXTENSION MEANS
Lynn Shatoska, Troy Shatoska, and Ronald W. Shatoska,
all of 5 Sun St., Morgan City, La. 70380
Filed Mar. 14, 1968, Ser. No. 713,175
Int. Cl. B62d 55/00
U.S. Cl. 180—9.48                                       1 Claim

ABSTRACT OF THE DISCLOSURE

The present invention pertains to novel track extension means for use with machines supported directly on wheels which in turn rest upon continuous linked tracks or Caterpillar drive chains. More particularly, the present invention relates to track extension means for use with vehicles having a continuous linked track system to which the present track means are operably connected whereby the vehicle is supported over a larger base area.

---

There are many types of vehicles on the market today utilizing a continuous linked track system or Caterpillar drive chains on which the vehicle is mounted for supporting and moving the vehicle over terrain unsuitable for conventional tires or wheels, e.g. over muddy terrain. A typical such vehicle is a crane for operating a dirt bucket or for lifting objects, e.g. piling and the like. In muddy or swampy terrain, it is common practice to support the vehicle upon wooden mats, otherwise, the vehicle would sink into the mud and be rendered immobile.

The present invention overcomes the above problem by the provision of track extension means which are operably connected to the existing tracking system of a crawler type of vehicle whereby a greater support areas is provided for the vehicle.

BACKGROUND OF THE INVENTION

The present invention pertains to that field of invention as embodied in Classes 180 and 305 of the U.S. Patent Office Classification System.

Various thread units or traction devices have been developed for use with vehicles having conventional tires over which such devices are operably fitted. By the addition of such means, the vehicle can be driven over terrain unsuitable for tire equipped vehicles, e.g. muddy terrain. Such a unit is described in U.S. Pat. No. 3,163,249. The present invention pertains to tread units which are added or attached to a vehicle having a track system which is of insufficient area to support the vehicle in a particular terrain. Unlike the prior art described above, the present means are not a substitute for, but rather, an addition to the vehicle driving system. Consequently, not only is additional traction realized, but additionally, the present system is more rapidly and easily installed.

SUMMARY

The present invention basically comprises continuous linked track extension means; means connecting the extension means to a machine supported and actuated upon a continuous linked track; and track extension driving means operably connected to the machine whereby the track extension means are driven simultaneously with the linked tracks of the machine. In this manner, the support base area of the machine is considerably increased, generally the track extension means being of a size sufficient to increase the support area at least two-fold. Consequently, the wooden mats as conventionally employed in the art today to support such a vehicle on marsh or swamp ground can be dispensed with by virtue of the present invention.

BRIEF DESCRIPTION OF THE DRAWINGS

FIG. 2 in the drawings is a side elevation view of a typical continuous linked track system showing the track extension means and the track extension driving means.

FIG. 3 is an isometric view of one section of suitable means for connecting the track extension means to the superstructure of the crawler type of vehicle with which it can be employed.

FIG. 4 is a side view of means for connecting together the means of FIG. 3.

DESCRIPTION OF THE PREFERRED EMBODIMENT

Figure 1:
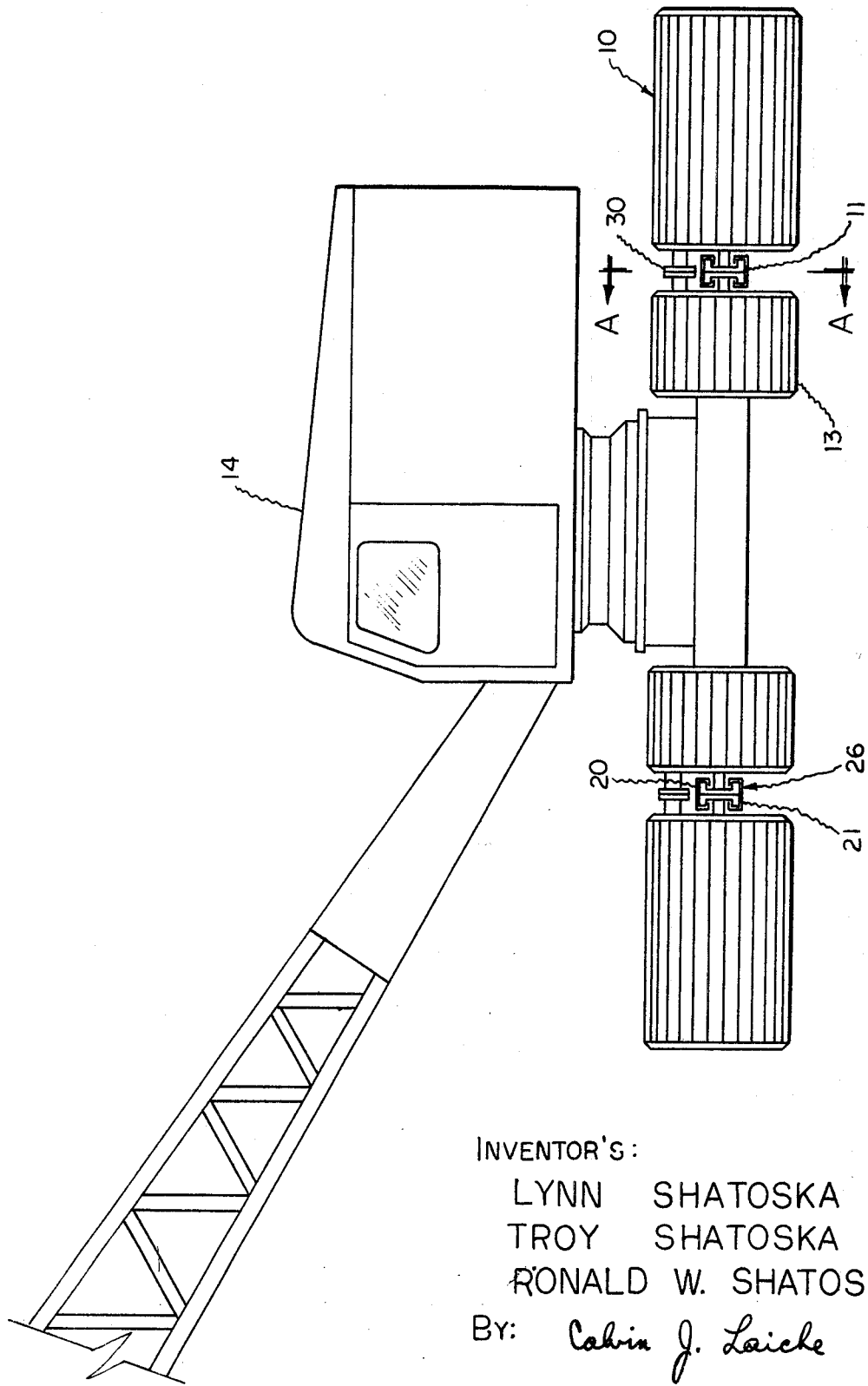
FIG. 1 in the drawing is a front elevation view of the present extension means operably connected to a continuous linked track system of a crane supported thereon, the cab of the crane being shown sideways in elevation together with part of its boom.

Referring to FIG. 1, the present invention comprises the track extension means 10 which further comprises the track connecting means 11 and the track extension driving means 12. The track extension means 10 can comprise any type of continuous linked tracks or Caterpillar drive chains. The structure of the means 10 can be identical to the continuous linked track system 13 of the crane 14.

As shown in FIG. 2, the linked track system 13 generally comprises a series of plates and innerconnecting pins which articulate relative to each other whereby the plates can pass over the internal cylindrical working members 15, 16, 17, a plurality of such members generally being present in a given track system design. The track is conventionally driven over such members by virtue of sprockets geared with the pins connecting the plates or a suitable mating sprocket track connected to the internal surface of the track system. The internal mechanism or track support and drive system of the present track extension means 10 is generally of similar design and construction as that of the thread system 13.

It is preferred that the track extension means 10 be provided with separate driving means having an independent power source. In this manner, problems that may arise due to the additional loading that would be imposed upon the driving system for the tracks 13 is avoided. This objective is preferably accomplished by providing a hydraulic drive system within the unit 10. The system is operated by hydraulic fluid under pressure provided by way of the hose 30. The latter is provided with the connector means 31, e.g. a flanged assembly, quick-connect assembly, or the like, whereby the unit 10 can be rapidly and easily connected.

The present track extension means can also be driven off of the same driving system that actuates the tracks 13. In such case, the member 30 represents a suitable drive connector means which is operably connected to the same driving system for the tracks 13.

In either of the above arrangements, it is important that the linear speed of the track means 10 be essentially equal to that of the track system 13. Otherwise, either one of the track systems would tend to over pull the other such that the slower track would either have to slip over the terrain or damage may occur to the faster track system. When utilizing the preferred arrangement of the present invention, that is, the means 10 being driven by independent driving means, it is preferred to allow the tracks 13 to freewheel while driving by the extension tracks 10. This naturally avoids the before mentioned problem.

The track connecting means 11 preferably comprises two of the T-shaped members 18 as shown in FIG. 3, viz., the members 20 and 21 shown in FIG. 1. The members 20 and 21 are rigidly attached to the internal superstructure of their respective track systems, for example, as shown in FIG. 2.

Each of the elongated T-shaped connector means 18 comprises the flanged portion 22 which is made integral with the web section 23 which is in turn connected to the channel portion 24. The flanged portion 22 is the portion that is rigidly attached to the superstructure of the track system, e.g. by welding, rivets, or the like. In an operable position, the channel portion 24 of a connector member 18 is butted up against the corresponding channel portion 24 of a mating member 18, for example, as shown in FIG. 1. In such a position, the side portions 25 of the channel portion 24 thereby form a mating flanged portion over which one of the channel members 26 is operably positioned.

As shown in FIG. 4, the channel members 26 are of such configuration that the butting flanged portions 24 of several adjacent members 18 are essentially totally enclosed and thereby rigidly held together. This is accomplished by virtue of the side wall portion 27 which includes the extension 28 which wraps around the respective side portions 25 of butting members 18. In such manner, the mating members 18, viz. 20 and 21 of FIG. 1, are rigidly held together in an operable relationship.

The present extension means can also be conveniently provided with or constructed around a pontoon superstructure whereby the unit will float. This construction is particularly preferred when utilizing the present unit in combination with a floating crane especially constructed for use in swampy regions.

In light of the above discussion, it will be apparent to one skilled in the art that considerable modifications can be made in the present invention without departing from its true scope and spirit. What we desire to cover by U.S. Letters Patent is as set forth in the appended claim.

We claim:
1. In a machine supported and actuated upon a continuous linked track, the improvement comprising:
(1) track extension means comprising a continuous linked track which means is operably connected to said machine whereby said machine is supported over a larger base area;
(2) means connecting said track extension means to said machine comprising:
 (a) a first elongated T-shaped member whose bottom portion is rigidly attached to the machine;
 (b) a second elongated T-shaped member whose bottom is rigidly attached to said track extension means, said members being positioned relative to each other such that their top portions when butted together in an operable relationship form an I-shaped configuration;
 (c) a first elongated channel shaped member adapted to slidably fit over one end portion of the I-shaped configuration;
 (d) a second elongated channel shaped member adapted to slidably fit over the other end portion of the I-shaped configuration whereby said T-shaped members are held together in a rigid and fixed relationship; and
(3) track extension driving means operably connected to said machine for driving said track extension means simultaneously with the linked tracks of said machine.

References Cited

UNITED STATES PATENTS

| | | | |
|---|---|---|---|
| 1,952,894 | 3/1934 | Ronk | 180—9.48 |
| 1,985,777 | 12/1934 | Hamilton | 180—9.48 X |
| 2,705,626 | 4/1955 | Ball | 180—6.48 X |
| 3,074,499 | 1/1963 | Bertelsen | 180—9.62 |
| 3,418,961 | 12/1968 | Gregg | 180—9.2 X |

OTHER REFERENCES

German printed application, Wenzel, June 1966.

RICHARD J. JOHNSON, Primary Examiner